No. 737,841. Patented September 1, 1903.

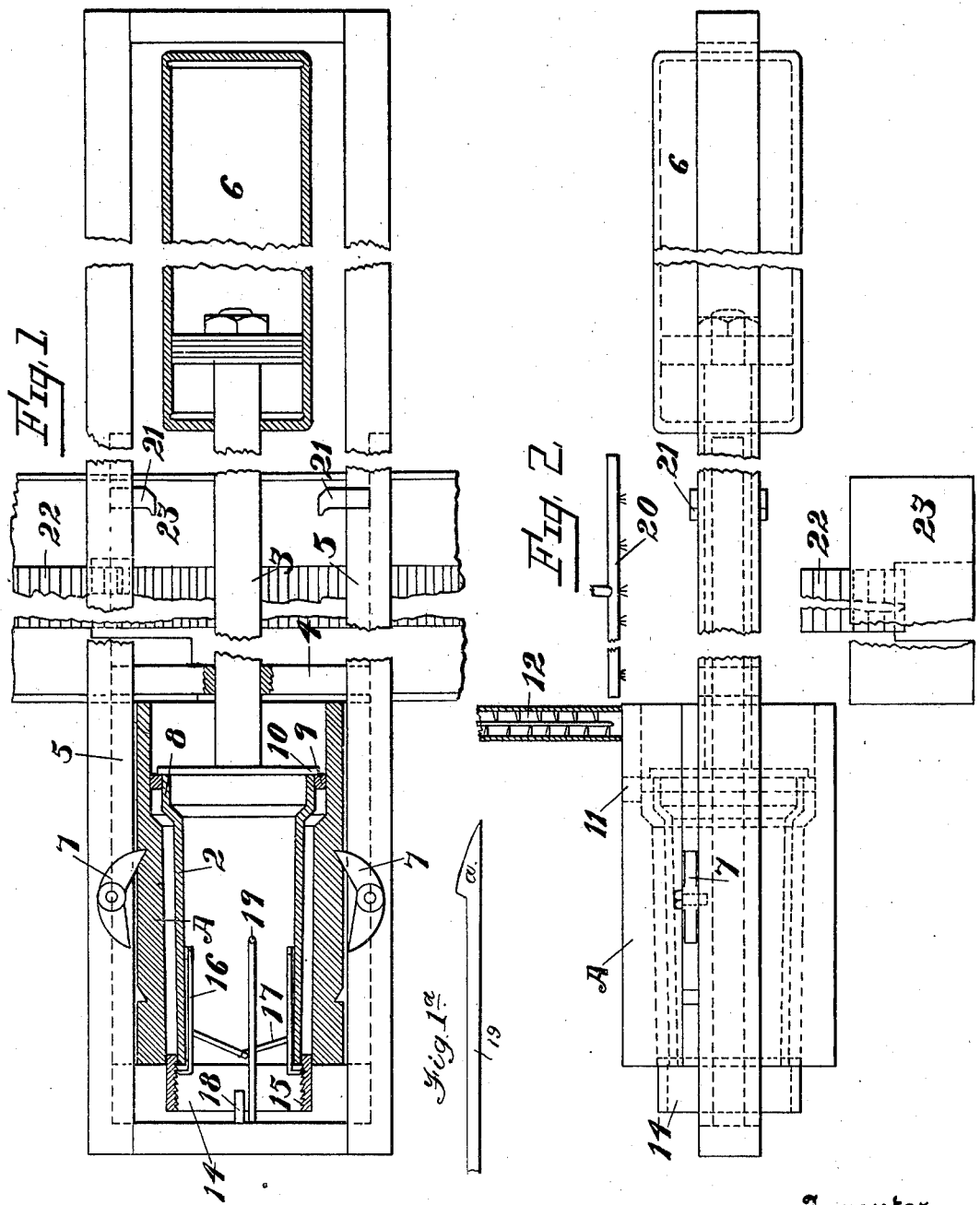

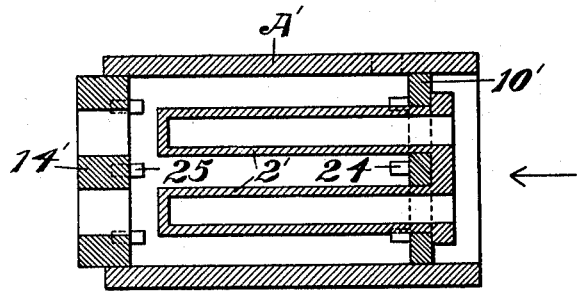
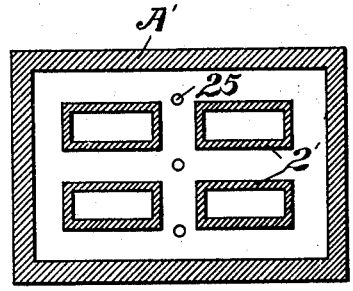
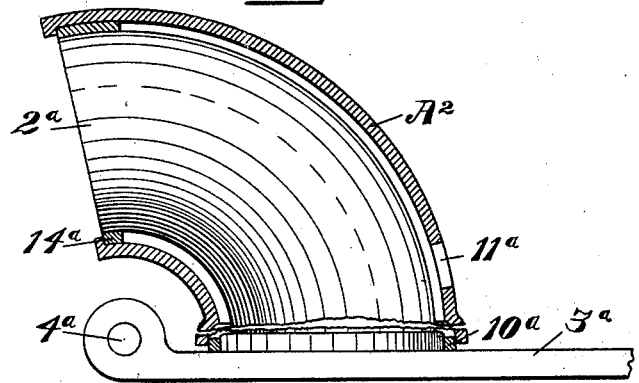
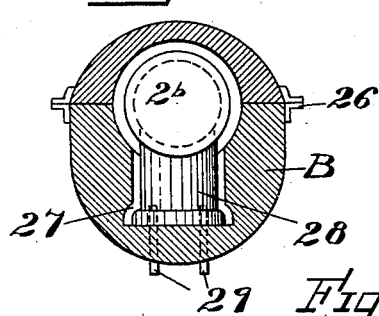
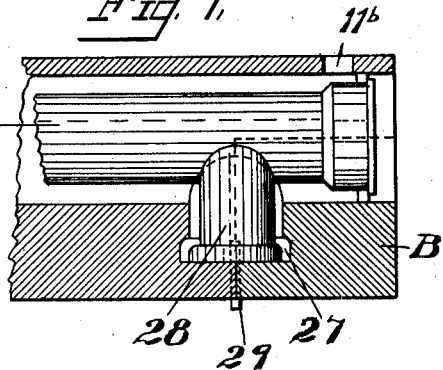
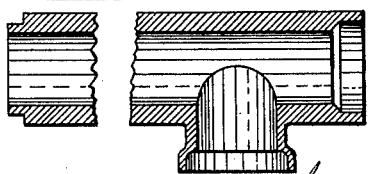

UNITED STATES PATENT OFFICE.

WALLACE A. HOUTS, OF OAKLAND, CALIFORNIA.

TILE-MAKING MACHINE.

SPECIFICATION forming part of Letters Patent No. 737,841, dated September 1, 1903.

Application filed October 13, 1902. Serial No. 127,023. (No model.)

*To all whom it may concern:*

Be it known that I, WALLACE A. HOUTS, a citizen of the United States, residing in Oakland, county of Alameda, State of California, have invented an Improvement in Tile-Making Machines; and I hereby declare the following to be a full, clear, and exact description of the same.

My invention relates to improvements in the manufacture of drain-tiles and the like. Its object is to provide a suitable machine for the manufacture of pipe or tiling from compositions containing asphaltum or such materials as are rendered plastic by heat and have the quality of setting into a hard resistant mass when cooled.

The invention comprises a mold, means for feeding material to the mold, means, including a plunger-core, for compressing the material therein, and rings engaging the core to free the tile from the mold and core.

It also comprises details to be more fully explained hereinafter, having reference to the accompanying drawings, in which—

Figure 1 is a horizontal central section of my invention. Fig. 1ª is a detail of the stop 19. Fig. 2 is a side elevation of same. Fig. 3 is a modification for making conduits. Fig. 4 is a cross-section of same. Fig. 5 is a modification for making elbows. Fig. 6 is a modification for making T's. Fig. 7 is a longitudinal section of same. Fig. 8 is a longitudinal section of T-pipe.

A represents a mold of suitable size and form, here shown as having a cylindrical cavity, slightly enlarged, adjacent to one end. A hollow core 2 is reciprocable in said mold and is of a diameter less than the mold by twice the desired thickness of the pipe or tile to be formed. The core is attached to a piston-rod 3, which is supported on a cross-head 4, slidable in guides 5, and is driven from a suitable source of power, as by engine 6. The mold is also supported in the guides 5 and has a reciprocating movement therein limited by the pawl or pawls 7 for the purpose shortly to be stated. The pawls 7 are tripped in any well-known manner, as by hand. The end of the core adjacent to its connection with rod 3 is enlarged, as at 8, for the purpose of forming the usual flange on the pipe when the core is forced into the mold. A ring 9 of the same diameter as the enlarged portion of the mold fits against an annular shoulder 10 on the core and is slidable on the enlarged portion of the core. Material preferably in a hot plastic form is fed into the mold through an opening 11 by a suitable screw conveyer 12. This feeding takes place when the mold is at its most forward point of travel to bring the opening 11 into line with the feed-passage of the hopper, in which the screw 12 operates. At the same time, the core having advanced within the mold to bring the ring 9 just within this enlarged portion of the mold, the material is forced by pressure into the space between this enlarged portion of the mold and the core until there is a sufficient quantity to form the tile. The core is then reciprocated to force the material down into the space between the reduced portions of the mold and core, while the ring and the respective shoulders on the core and the interior of the mold give form to the flange on the end of the pipe. As the core moves to compress the material it carries the mold back with it sufficiently to take the feed-opening 11 out of line with the conveyer and so prevent the escape of the material from the mold. The further travel of the mold is then checked temporarily by pawl 7, while the core continues its inward movement and carries ring 9 over opening 11, the ring thus acting as a slide-valve. In order to take up any space between the mold and core not filled with material to give finish to the smaller end of the tile and to aid in the removal of the tile from the mold, I provide a ring-follower 14, which is slidable on the core in the reduced portion of the mold. The inner periphery of the ring is notched, as indicated at 15. Spring-catches 16, projecting beyond the end of the core and connected by a toggle 17, are secured to the inside of the core and are adapted when expanded by reason of the toggle striking the stop 18 to engage the notches in the ring. Before, however, the core has gone the full length of its stroke it will have acted on the material to press it into the mold sufficiently to give it the desired tile form. Thereupon the pawl 7 is tripped, and the mold is allowed to move with the core, bringing the rear end of the tile up against ring 14, over which the mold is freely slidable. This causes pressure to be exerted on each end of the tile within the mold to give perfect form and cohesiveness to the tile. The retraction of the core carries ring 14 with it, the ring serving as a follower to protect the end of the tile and to remove it from the mold. In order to assist in the withdrawal of the tile, the mold is preferably made on a slight taper, diminishing in diameter toward the rear end. Correspondingly the core is tapered toward its outer end. As soon as the tile is loosened from the mold a stop 19 breaks the toggle to release the catches and ring, while the latter remains in the mold until carried back by the next charge in the manner just described. The stop 19 consists of a spring-rod permanently secured to end of frame and extending into the space inclosed by the core when it is within the mold. As shown in Fig. 1$^a$, it has a cam-lug $a$ at its outer end. The inner face of this lug is rather abrupt, so as to offer sufficient resistance to the toggle to break it, but which will allow the toggle to pass on over it (after being broken) with the continued retraction of the core, the spring-rod 19 bending sufficiently for the purpose. When the core comes back into the mold for a fresh charge, the toggle-arms easily ride over cam $a$. The moment the front end of the tile issues from the mold it encounters a stream of cold water from pipe 20, which causes the material to set rapidly. When the tile is fully withdrawn from the mold, dogs 21 engage the flanged end of the tile protected by ring 9 to remove it from the core, whence it is deposited upon a suitable conveyer at 22 and adapted to be submerged in a cooling-tank 23. The tile is thus removed from the core by the continued retraction of the core after the dogs are engaged, which causes the tile to loosen from the core and slip off onto the elevator or conveyer.

In the manufacture of tiles for conduits a machine differing slightly in form, though identical in principle, is used, as illustrated in Figs. 3 and 4. A' is a rectangular mold in which a plurality of cores 2', corresponding to the openings in a conduit-section, are movable. The mold and cores are preferably made slightly tapered throughout their length, and the sections are fitted to each other end to end. Plate 10' (which is analogous to ring 10 of Fig. 1) carries a series of projections 24, which are adapted to be pressed into the end of the tile when the cores are reciprocated to compress the material, and plate 14' (analogous to ring 14 of Fig. 1) has a series of holes disposed in due relation to the projections 24 on plate 10', in which are loosely inserted the pins 25. When plate 14' is brought up against the rear end of the tile, the pins 25 are pressed into the material and are deposited there as dowel-pins. Thus when the opposite ends of two completed sections are brought together these dowel-pins fit the holes made by the projections 24.

Fig. 5 shows a modification of the machine as adapted to form pipe-elbows. A$^2$ represents a segmental annular mold in which the curved core 2$^a$ is reciprocable. The core is secured to an arm 3$^a$, attached to the vertical shaft 4$^a$. Power is transmitted to rotate this shaft to reciprocate the core as desired. Material is fed in, as at 11$^a$, and rings 10$^a$ and 14$^a$ operate in essentially the same manner and for the same purpose as described in the first instance.

Figs. 6 and 7 show a machine adapted to form T's. In this case a machine of essentially the same character as first described is used, except that the tile is made without a protuberant flange, but instead is cored out at one end to receive the end of a tile-section, as shown in Fig. 8. The mold is formed with a removable section B opposite to the feed-opening 11$^b$. This section may be clamped to the mold by suitable locking devices, as 26. The bottom of the mold is of sufficient thickness that an annular space 27 may be made for the purpose of accommodating the lateral projection to be formed on the pipe. This annular space is formed on the line of juncture of the section and body of the mold, as shown, and a core 28 is secured centrally of this space by means of the pins 29 being clamped between the parts when the latter are brought together. The end of the core 28 is concaved to fit the convexity of the core 2$^b$, and the latter moves snug against the end of the former. When the material is inserted into the mold, the core is reciprocated to press the material into all the interstices of the die. As soon as the tile is completed the section B is removed, permitting the withdrawal of the tile and core 28 from the mold, as previously described.

Having thus described my invention, what I claim, and desire to secure by Letters Patent, is—

1. The combination in a tile-making machine, of a mold, a core reciprocable in said mold, means for delivering material in a plastic state into the space between said mold and core, means on the core for compressing said material, and means engaged by the core by which the tile is removed from the mold on the retraction of the core.

2. The combination in a tile-making machine of a mold, a core reciprocable in said mold, means for delivering material between said mold and core, and a follower carried upon the exterior of the core by which the material is compressed and removed from the mold.

3. The combination in a tile-making machine of a mold, a reciprocable core, means for delivering plastic material into the space between the core and mold, and a compression member and follower on opposite ends of the core in the space between the mold and core, and between which compression member and follower the tile is compressed.

4. The combination in a tile-making machine, of a mold, a reciprocable core, means for delivering material between the mold and core, a compression-ring upon the core and a follower engaged by said core to remove the tile from the mold.

5. The combination in a tile-making machine, of a mold having a limited reciprocating movement, feed means adapted to be cut off by the reciprocation of said mold, a reciprocating core and a follower on the core by which the material is compressed and by which the tile is removed from the mold.

6. The combination in a tile-making machine, of a mold having a limited reciprocating movement, a core reciprocable in and independently of said mold, means for delivering material between said core and mold and for compressing it therein, a ring slidable on the core, against which the end of the tile is pressed on a movement of the mold, and means engaging said ring to remove the tile from the mold.

7. The combination in a tile-making machine, of a mold, a reciprocating core, means for delivering material in a plastic condition into said mold, means for retracting the finished tile, means by which a spray of water is directed upon the tile as it issues from the mold, and means for removing the tile from the core.

8. The combination in a tile-making machine, of a mold, a reciprocating hollow core, means for delivering material into the space between said mold and core, rings slidable upon said core forming end abutments for the material in the mold, and means upon the core by which one of the rings may be engaged to retract the tile.

9. The combination in a tile-making machine of a sectional mold, a reciprocable core, a stationary core disposed at an angle in relation to said reciprocable core, means for delivering material to said mold, and means by which the finished tile may be removed from the mold.

In witness whereof I have hereunto set my hand.

WALLACE A. HOUTS.

Witnesses:
S. H. NOURSE,
JESSIE C. BRODIE.